(12) United States Patent
Katayama et al.

(10) Patent No.: US 7,693,444 B2
(45) Date of Patent: Apr. 6, 2010

(54) IMAGE READING AND RECORDING APPARATUS HAVING A CARTRIDGE DISMOUNTING SPACE BETWEEN A FIXING UNIT AND AN EXPOSING UNIT

(75) Inventors: Takafumi Katayama, Kashiwa (JP); Fumihiko Nakamura, Kashiwa (JP); Tatsuyuki Yamamoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 1354 days.

(21) Appl. No.: 11/133,244

(22) Filed: May 20, 2005

(65) Prior Publication Data

US 2005/0264853 A1 Dec. 1, 2005

(30) Foreign Application Priority Data

May 28, 2004 (JP) ............................. 2004-158762

(51) Int. Cl.
*G03G 21/20* (2006.01)
(52) U.S. Cl. ........................................ 399/94; 399/107
(58) Field of Classification Search .................. 399/94, 399/107, 111
See application file for complete search history.

(56) References Cited

U.S. PATENT DOCUMENTS

| 5,490,667 | A | 2/1996 | Nagashima et al. | ......... 271/225 |
|---|---|---|---|---|
| 5,745,246 | A | 4/1998 | Takaki et al. | ................. 358/296 |
| 6,134,041 | A * | 10/2000 | Hong et al. | ............... 359/216.1 |
| 6,826,373 | B2 * | 11/2004 | Nomura | ....................... 399/111 |
| 6,934,492 | B2 * | 8/2005 | Hiura et al. | .................. 399/258 |
| 2002/0061206 | A1 * | 5/2002 | Enomoto et al. | ............ 399/124 |
| 2002/0131792 | A1 | 9/2002 | Nomura | ....................... 399/118 |
| 2004/0190934 | A1 * | 9/2004 | Okabe | ......................... 399/111 |
| 2004/0258433 | A1 * | 12/2004 | Saito et al. | ................... 399/111 |

FOREIGN PATENT DOCUMENTS

| CN | 1254848 | 5/2000 |
|---|---|---|
| JP | H04-95973 | 3/1992 |
| JP | H04-358462 | 12/1992 |
| JP | H05-5464 | 1/1993 |

OTHER PUBLICATIONS

Jul. 13, 2007 Chinese Office Action in Application No. 200510072262X.

* cited by examiner

*Primary Examiner*—Quana M Grainger
(74) *Attorney, Agent, or Firm*—Fitzpatrick, Cella, Harper & Scinto

(57) ABSTRACT

An image reading and recording apparatus has a scanner unit for effecting exposure conforming to an image signal on a photosensitive drum, a heat roller pair for fixing a toner image formed on a recording sheet, and a reading unit for reading an original. The heat roller pair is disposed above a process cartridge, and a cartridge dismounting space for permitting dismounting of the process cartridge therethrough is disposed between the heat roller pair and the scanner unit.

8 Claims, 4 Drawing Sheets

IMAGE READING AND RECORDING APPARATUS HAVING A CARTRIDGE DISMOUNTING SPACE BETWEEN A FIXING UNIT AND AN EXPOSING UNIT

BACKGROUND OF THE INVENTION

1. Field of the Invention

This invention relates to an image reading and recording apparatus such as a copying machine, a facsimile apparatus or a multi-function printer.

2. Related Background Art

Nowadays, in copying machines, facsimile apparatuses, etc., recording of a high quality is possible and therefore, apparatuses of an electrophotographic type have come widely into use, and have also come to be used in personal use.

As shown, for example, in FIG. 4 of the accompanying drawings, there is an apparatus for forming an image on a recording medium by an image forming portion 50 having a photosensitive drum and a developing device (see Japanese Utility Model Application Laid-Open No. H05-5464). In case of image forming, a recording medium is conveyed along a conveying path 51 formed in the lower portion of the apparatus. At the same time, a laser beam is applied from a scanner, not shown, to the photosensitive drum of the image forming portion 50 to thereby form a toner image, which is then transferred to the recording medium being conveyed to thereby form an image. Further, the recording medium to which the toner image has been transferred is conveyed to a fixing device 53 to thereby heat-fix the toner image, whereafter the recording medium is discharged.

The above-described apparatus is provided with a recording unit 54 for reading an original, and on the basis of information read by this reading unit 54, makes it also possible to effect image forming as a copying function, and transmit a formed image to another apparatus via a facsimile function.

Also, the fixing device 53 is located in the lower portion of the apparatus, and this has led to the problem that the fixing heat thereof is liable to fill the interior of the apparatus and the internal temperature of the apparatus is liable to rise.

Also, in a case where in the above-described apparatus, an attempt is made to make the photosensitive drum and the developing device of the image forming portion 50 into a cartridge and mount or dismount them as a process cartridge with respect to an apparatus main body, the mounting or dismounting must be done after the scanner or the reading unit 54 is pivotally or otherwise moved to thereby retract them. This has led to the problem that the mounting and dismounting operability of the process cartridge is poor.

SUMMARY OF THE INVENTION

The present invention has been made in view of the above-noted points and the object thereof is to provide an image reading and recording apparatus which is improved in the mounting and dismounting operability of a process cartridge, and further suppresses the rise of the internal temperature of the apparatus caused by the heat from the fixing device.

The image reading and recording apparatus of the present invention for solving the above-noted problems has a process cartridge provided with an image bearing member and detachably mountable on an apparatus main body, an exposing unit for effecting exposure conforming to an image signal on the image bearing member, a fixing device disposed on one side of the apparatus main body and above the process cartridge for heat-fixing a toner image on a recording medium, and a reading unit disposed on another side of the apparatus main body with respect to the exposing unit. The reading unit has an original conveying device for conveying an original and a reading sensor for reading the image of the original while the original is conveyed by the original conveying device. The apparatus also includes a cartridge dismounting space provided between the fixing device and the exposing unit for dismounting the process cartridge therethrough. The reading sensor is provided below the fixing device.

DESCRIPTION OF THE PREFERRED EMBODIMENTS

Figure 1:
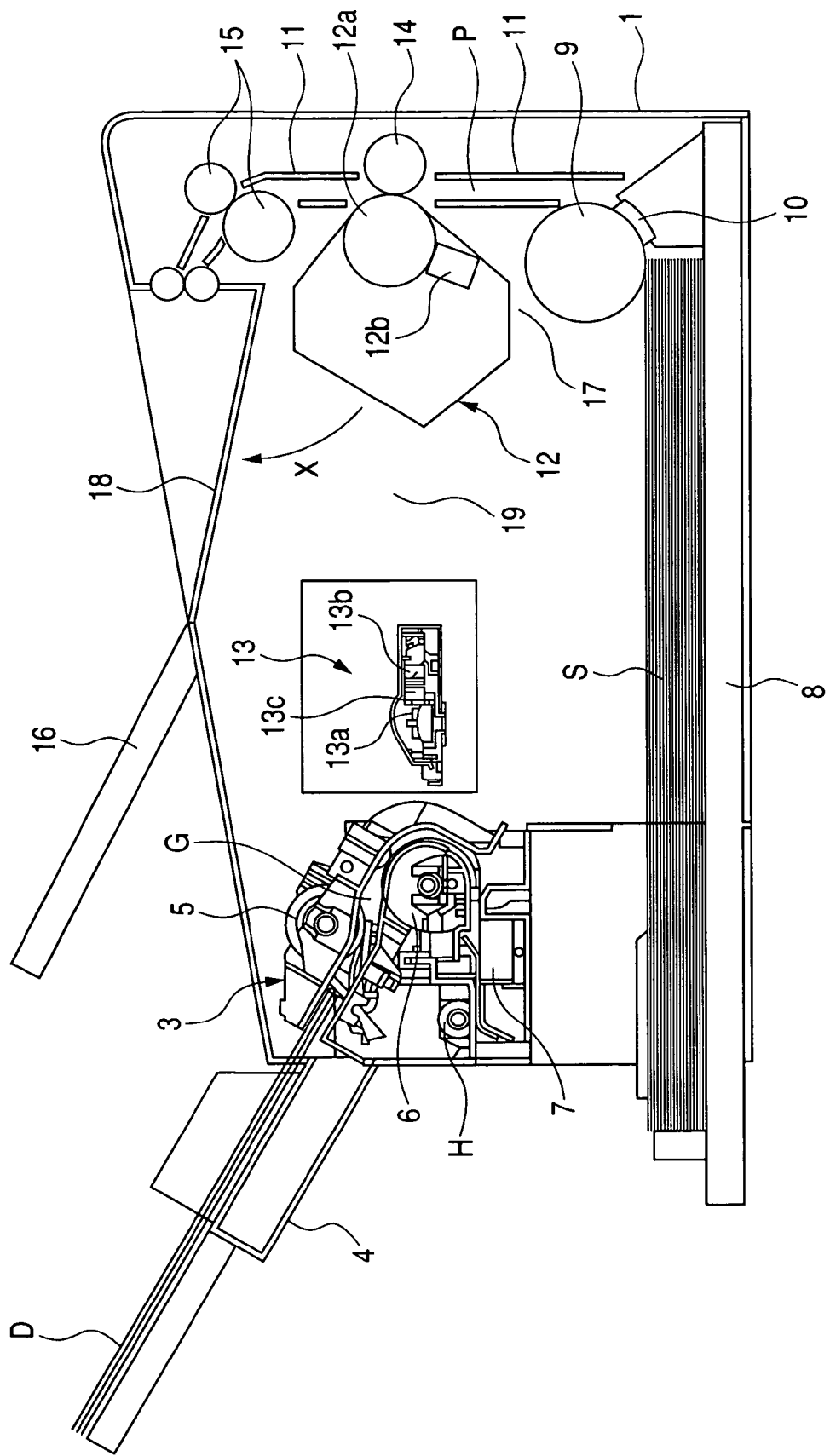
FIG. 1 is a typical cross-sectional view illustrating an image reading and recording apparatus.
Figure 2:
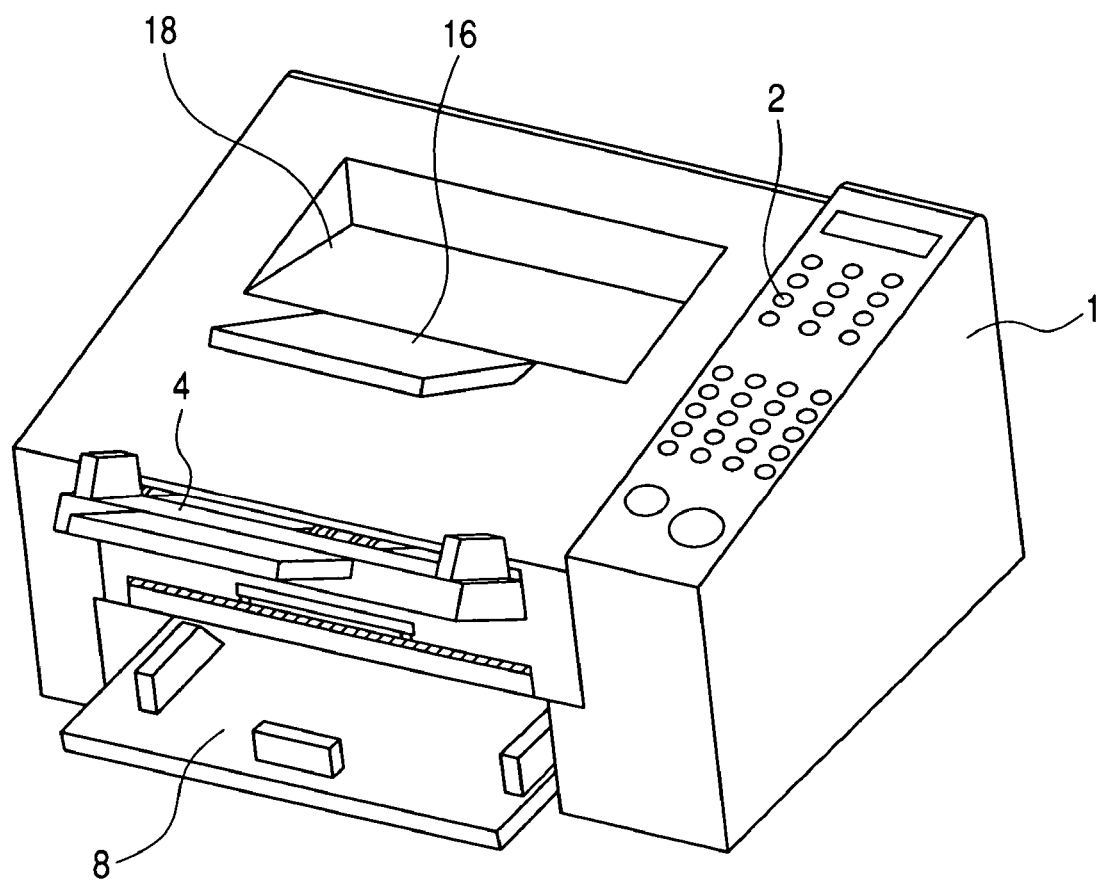
FIG. 2 is a perspective view of the image reading and recording apparatus.
Figure 3:
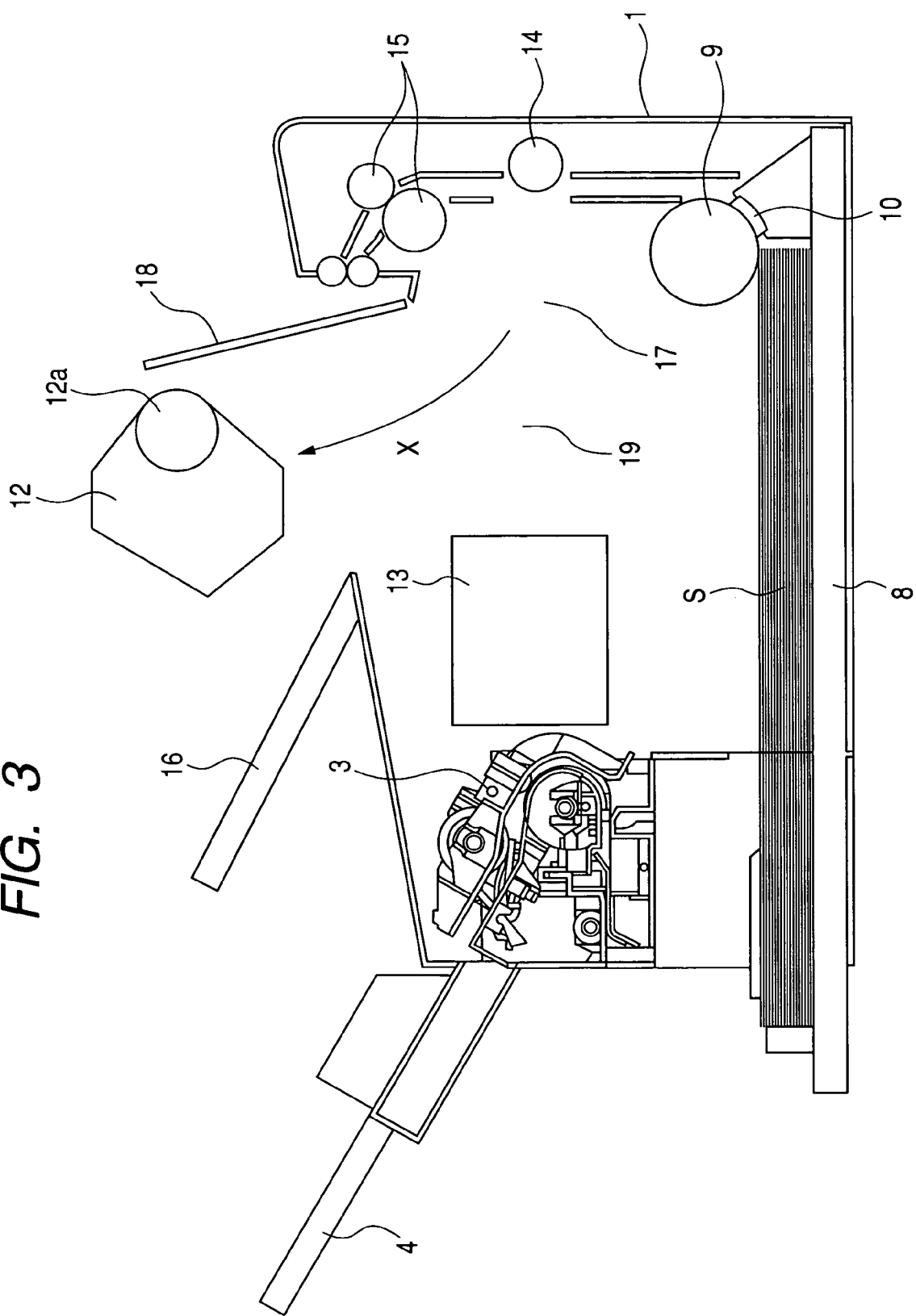
FIG. 3 is a schematic illustration of the dismounting state of a process cartridge.
Figure 4:
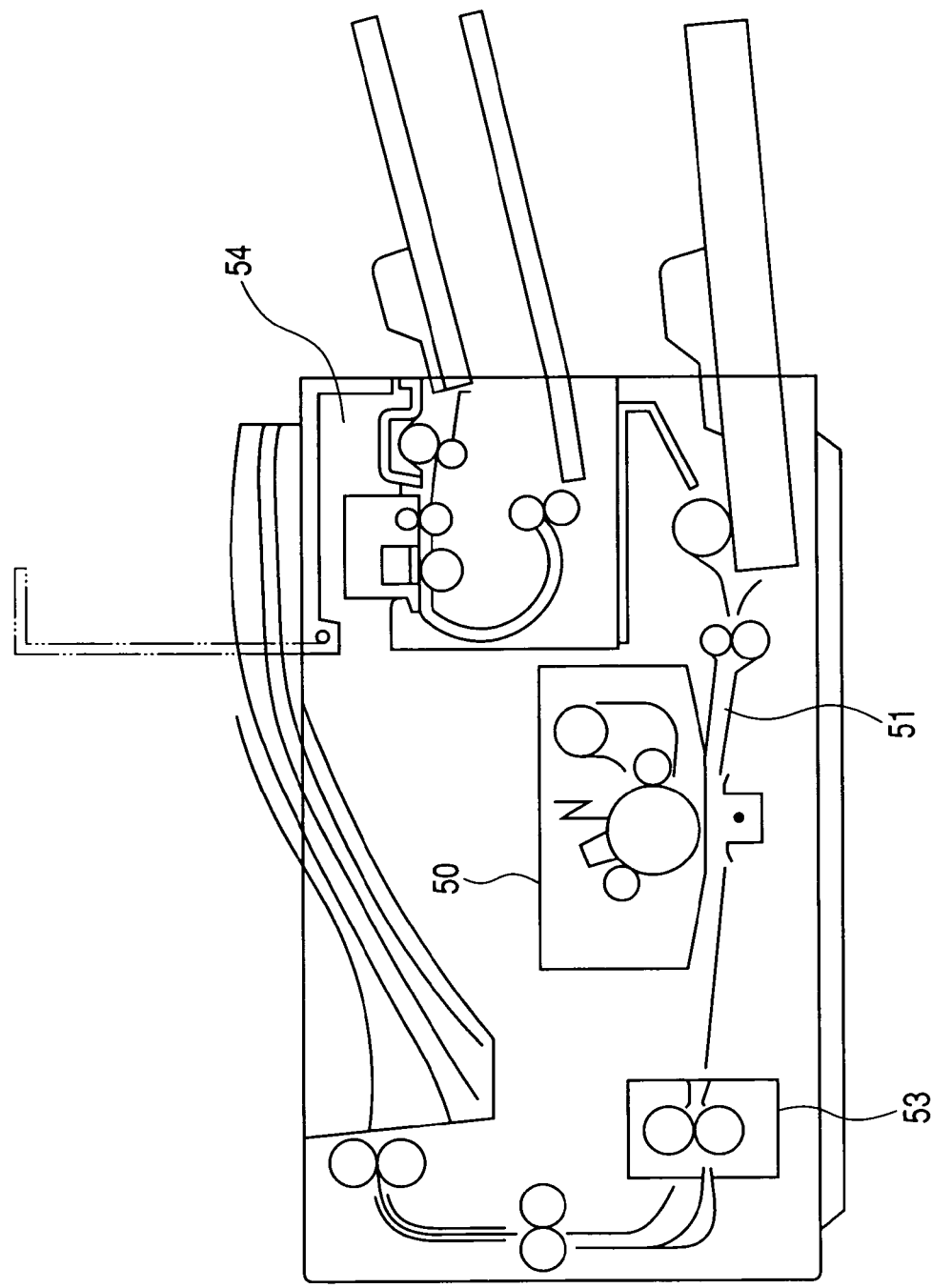
FIG. 4 is a typical cross-sectional view of a conventional image reading and recording apparatus

An image reading and recording apparatus according to an embodiment of the present invention will hereinafter be described with reference to the drawings. FIG. 1 is a typical cross-sectional illustration of the image reading and recording apparatus, FIG. 2 is a perspective view of the image reading and recording apparatus, and FIG. 3 is a schematic illustration of the detachably mounted state of a process cartridge.

{General Construction of the Image Reading and Recording Apparatus}

The general construction of the image reading and recording apparatus will first be described. In the present embodiment, a facsimile apparatus provided with copying and printer functions is shown as an example of the image reading and recording apparatus.

The image reading and recording apparatus according to the present embodiment has an operating panel 2 (see FIG. 2) for performing various operations provided on the upper surface of an apparatus main body. An operator operates the operating panel 2 from a front side (the left side as viewed in FIG. 1) of the apparatus. Also, the design of the apparatus is made such that the user can set originals from the front side of the apparatus, and can take out a recording medium (hereinafter referred to as the "recording sheet") after recording.

As shown in FIG. 1, a reading unit 3 functioning as original reading means is disposed on the front side of the apparatus. An original conveying device of the reading unit 3 has a separating roller 5, a conveying roller 6, a U-shaped original conveying path G, and a discharging roller pair H. The original conveying device separates and feeds originals D set on an original tray 4 protruding from the front side of the apparatus main body with the image surfaces thereof facing upwardly one by one by the separating roller 5, and also U-turn-conveys the originals by a conveying roller 6 along the original conveying path G. Then, the reading unit 3 reads an image described on the original D being conveyed by a close contact type image sensor (reading sensor) 7, and the image is transmitted as read data to the exposing means of the apparatus itself in the case that the apparatus operates in a copying mode, and to the exposing means of another apparatus in the case that the apparatus operates in a facsimile mode. The U-turn-conveyed original is discharged to the front side of the apparatus by a discharging roller pair H.

Also, a sheet supporting tray 8 for supporting recording sheets S is provided in the lower portion of the apparatus main body 1. The recording sheets S are conveyable from the sheet supporting tray 8 to the upper portion of the apparatus. That is, a feeding roller 9 and a separating pad 10 are provided on the lower portion of the rear side (the right side as viewed in FIG. 1) of the apparatus main body, and when the apparatus receives a recording start signal, the feeding roller 9 is driven to thereby separate and feed the recording sheets S one by one, and the sheets S are guided and conveyed upwardly in the apparatus by a conveying guide 11 provided along the rear side of the apparatus. The conveying guide 11 forms a recording sheet conveying path P disposed in a substantially vertical direction on a rear side of the apparatus main body for guiding the recording sheet from the feeding roller 9 to a heat roller pair 15.

In synchronism with the above-described conveyance of the sheet, a toner image is formed by a process cartridge 12 constituting an image forming portion, and this toner image is transferred to the recording sheet S being conveyed to thereby effect image recording. In the process cartridge 12, a photosensitive drum 12a functioning as an image bearing member and a developing device 12b are integrally made into a cartridge, and by this cartridge being mounted on the apparatus main body, an image is formed by an electrophotographic process. That is, a laser beam conforming to an image signal is applied from a scanner unit 13, which is an exposing unit, to the photosensitive drum 12a while being rotated to thereby form an electrostatic latent image on the photosensitive drum 12a, and this latent image is toner-developed as a visible image by the developing device 12b, and the toner image is transferred to the recording sheet being conveyed by the application of a bias to a transfer roller (transfer member) 14.

The recording sheet S to which the above-mentioned toner image has been transferred is heated while being conveyed by a heat roller pair 15 which is a fixing device in the upper portion of the apparatus, whereby the toner image thereon is fixed, whereafter the recording sheet S is discharged to a discharging portion provided on a upper surface of the apparatus main body. An upper surface of an openable and closable member 18 and an upper surface of discharge tray 16 constitute the discharging portion.

The scanner unit 13 functioning as the exposing unit, which effects exposure on the photosensitive drum 12a, has a laser diode 13c which is a light emitting portion, a polygon mirror 13a, an imaging lens 13b, etc., provided therein, and light from the laser diode 13c emitting light in conformity with the image signal is deflected by the polygon mirror 13a, and thereafter is imaged by the imaging lens 13b and is applied to the photosensitive drum 12a.

{Disposition of Various Members}

A description will now be made of the disposition of various members such as the scanner unit 13 and the heat roller pair 15.

A cartridge mounting space 17 is provided in the substantially central portion of the rear side of the apparatus main body 1. The process cartridge 12 is mountable in this cartridge mounting space 17. The mounting or dismounting of this process cartridge 12 is effected by upwardly opening an openable and closable member 18 provided in the upper portion of the apparatus. As the construction of cartridge mounting means, cartridge inserting guides are provided on the opposite inner wall surfaces of the cartridge mounting space 17, and the apparatus is designed such that guide projections formed on the longitudinally opposite sides of the cartridge are inserted along the inserting guides, whereby the process cartridge 12 can be mounted in the cartridge mounting space 17.

The heat roller pair 15, which is the fixing device, is disposed above the cartridge mounting space 17. That is, since the heat roller pair 15 is disposed in the upper portion of the apparatus, heat generated by this heat roller pair 15 escapes upwardly and the exhaust of the heat to the outside of the apparatus is promoted, and it is difficult for the process cartridge 12, etc., mounted below the heat roller pair 15, to be affected by the heat.

Also, the heat roller pair 15 is disposed in the rear side of the apparatus main body so that the exhaust of heat from the heat roller pair 15 can be effected toward the rear side of the apparatus. In order to shorten the conveying path of the recording sheet, the cartridge mounting space 17 is disposed so that the process cartridge 12 may also be mounted on the rear side of the apparatus.

Further, the scanner unit 13 and the reading unit 3 are disposed so as to be substantially at the same height as the position at which the process cartridge 12 is mounted. Thus, it is also difficult for the scanner unit 13 and the reading unit 3 to be affected by the heat of the heat roller pair 15.

If the scanner unit 13 and the process cartridge 12 are disposed in the vertical direction of the apparatus with respect to each other, the apparatus is liable to become bulky, but in the present embodiment, these are disposed substantially at the same height in a lateral direction and therefore, the apparatus does not become bulky and the construction of the apparatus also does not become complicated.

The scanner unit 13, the close contact type image sensor 7, and the original conveying device of the reading unit 3 are provided inside of a projection area located vertically above the sheet supporting tray 8.

The cartridge mounting space 17 is disposed on the rear side of the apparatus as previously described, whereas the reading unit 3 is disposed on the front side of the apparatus. Therefore, it is easy for the operator being on the front side of the apparatus to set the originals relative to the reading unit 3. Moreover, the reading unit 3 U-turn-conveys the original and reads it and therefore, the apparatus is designed such that the read original is discharged to the front side of the apparatus and the treatment thereof can be done easily also from the front side of the apparatus. The heat roller pair 15 is disposed on the rear side of the apparatus main body, whereas the reading unit 3 is disposed on the front side of apparatus main body, and the close contact type image sensor 7 is disposed below the heat roller pair 15. Therefore, it is difficult for the close contact type image sensor 7 of the reading unit 3 to be affected by the heat of the heat roller pair 15.

The scanner unit 13 which applies a laser beam to the photosensitive drum of the mounted process cartridge 12 is disposed between the reading unit 3 and the cartridge mounting space 17. A cartridge dismounting space 19 is provided among the scanner unit 13, the cartridge mounting space 17, and the heat roller pair 15. By the cartridge dismounting space 19 being thus provided between the mounted process cartridge 12 and the scanner unit 13, it becomes possible to open the openable and closable member 18 and dismount the process cartridge 12 in the direction of arrow X from the upper portion of the apparatus, as shown in FIG. 3.

The reading unit 3 is disposed more toward the front side of the apparatus than the scanner unit 13. The original conveying device of the reading unit 3 is disposed at the same height of the scanner unit 13. Therefore the reading unit 3 does not become a hindrance in case of the mounting and dismounting of the process cartridge 12. That is, the operation of mounting or dismounting the process cartridge 12 can be easily performed without the scanner unit 13 and the reading unit 3 disposed in the lateral direction being moved. It can be formed that with original conveying device disposed below the scanner unit.

Also, the scanner unit 13 and the heat roller pair 15 are spaced apart from each other by an amount corresponding to the cartridge dismounting space and therefore, it is difficult for the scanner unit 13 to be affected by the heat of the heat roller pair 15.

In the present embodiment, the cartridge dismounting space 19 is disposed between the fixing device 15 and the scanner unit 13 and therefore, the dismounting of the process cartridge 12 becomes easy. Also, the fixing device 15 is disposed above the process cartridge 12 and therefore, it becomes possible to suppress the rise of the internal temperature of the apparatus due to the fixing heat. Also, because the cartridge dismounting space 19 for dismounting the process cartridge 12 therethrough is provided between the fixing device 15 and the scanner unit 13, it is difficult for the scanner unit 13 to be affected by the heat of the fixing device 15.

This application claims priority from Japanese Patent Application No. 2004-158762 filed May 28, 2004, which is hereby incorporated by reference herein.

What is claimed is:

1. An image reading and recording apparatus comprising:
   a process cartridge provided with an image bearing member and detachably mountable on an apparatus main body;
   an exposing unit that effects exposure conforming to an image signal on said image bearing member;
   a fixing device disposed on one side of the apparatus main body and above said process cartridge and heat fixes a toner image on a recording medium;
   a reading unit disposed on another side of the apparatus main body with respect to said exposing unit, wherein said reading unit has an original conveying device that conveys an original and a reading sensor that reads the image of the original while the original is conveyed by said original conveying device; and
   a cartridge dismounting space provided between said fixing device and said exposing unit,
   wherein said process cartridge is mounted or dismounted through said cartridge dismounting space,
   wherein the recording medium on which a toner image is fixed by said fixing device is discharged from the one side of the apparatus main body toward the another side of said apparatus main body, and
   wherein said original conveying device is provided with a U-shaped original path through which the original is conveyed, wherein the original before reading by the reading sensor is set on said reading unit from the another side of said apparatus main body, the set original before reading by the reading sensor is fed toward the one side of said apparatus main body and is conveyed through said U-shaped original path, and a read original is discharged toward the another side of said apparatus main body.

2. An image reading and recording apparatus according to claim 1, wherein said reading unit, said process cartridge and said exposing unit are disposed substantially at the same height.

3. An image reading and recording apparatus according to claim 1, wherein said process cartridge is positioned with respect to said cartridge dismounting space so as to be upwardly taken out of the apparatus main body when said process cartridge is dismounted from the apparatus main body.

4. An image reading and recording apparatus according to claim 1, wherein said reading unit and said process cartridge are disposed substantially at the same height.

5. An image reading and recording apparatus according to claim 1, wherein said fixing device is provided above said exposing unit.

6. An image reading and recording apparatus according to claim 1, wherein said another side of the apparatus main body at which said reading unit is disposed is a front side of the apparatus main body, wherein said apparatus further comprises:
   a recording medium supporting tray that supports the recording medium disposed below said process cartridge;
   a feeding roller which feeds the recording medium on said recording medium supporting tray;
   a transferring member that transfers the image borne on said image bearing member to the recording medium fed by said feeding roller;
   a discharge portion on which a recording medium having a fixed toner image fixed by said fixing device is stacked and wherein said discharge portion is provided on the upper surface of the apparatus main body;
   a operating panel which is operable by an operator from the front side of the apparatus main body at which said image reading unit is disposed; and
   a conveying path extending in a substantially vertical direction on a rear side of the apparatus main body, opposed to the front side of the apparatus main body, the conveying path guiding the recording medium from said feeding roller to said fixing device.

7. An image reading and recording apparatus according to claim 1, wherein said exposing unit is provided with a light emitting portion emitting light in conformity with an image signal, a polygon mirror that deflects the light from said light emitting portion, and an imaging lens that images the light deflected by said polygon mirror.

8. An image reading and recording apparatus according to claim 1, wherein said reading sensor is provided below said fixing device.

* * * * *